(12) United States Patent
Sayed et al.

(10) Patent No.: US 12,060,520 B2
(45) Date of Patent: Aug. 13, 2024

(54) FOAMED WETTABILITY ALTERATION TREATMENT FOR DEEP CONDENSATE AND WATER BLOCKAGE IN GAS RESERVOIRS

(71) Applicant: ARAMCO SERVICES COMPANY, Houston, TX (US)

(72) Inventors: Mohammed Ali Ibrahim Sayed, Katy, TX (US); Rajesh Saini, Cypress, TX (US)

(73) Assignee: ARAMCO SERVICES COMPANY, Houston, TX (US)

( * ) Notice: Subject to any disclaimer, the term of this patent is extended or adjusted under 35 U.S.C. 154(b) by 0 days.

(21) Appl. No.: 17/644,346

(22) Filed: Dec. 15, 2021

(65) Prior Publication Data
US 2023/0183557 A1  Jun. 15, 2023

(51) Int. Cl.
*C09K 8/584* (2006.01)
*C09K 8/594* (2006.01)
*E21B 43/25* (2006.01)

(52) U.S. Cl.
CPC ............. *C09K 8/584* (2013.01); *C09K 8/594* (2013.01); *E21B 43/255* (2013.01); *C09K 2208/10* (2013.01); *C09K 2208/30* (2013.01)

(58) Field of Classification Search
CPC .... C09K 8/584; C09K 8/594; C09K 2208/10; C09K 2208/30; E21B 43/255
See application file for complete search history.

(56) References Cited

U.S. PATENT DOCUMENTS

| | | |
|---|---|---|
| 4,519,455 A | 5/1985 | Holtmyer et al. |
| 7,261,158 B2 | 8/2007 | Middaugh et al. |
| 8,770,295 B2 | 7/2014 | Harris et al. |
| 2007/0044965 A1* | 3/2007 | Middaugh .............. C09K 8/703 507/213 |
| 2007/0225176 A1* | 9/2007 | Pope ..................... C08F 214/18 507/221 |
| 2010/0044050 A1* | 2/2010 | Savu ....................... C09K 8/38 524/544 |
| 2012/0055668 A1* | 3/2012 | Wu ........................ C09K 8/588 507/205 |
| 2015/0021022 A1 | 1/2015 | Ladva et al. |
| 2015/0315455 A1* | 11/2015 | Sayed .................... C09K 8/524 166/305.1 |
| 2017/0058186 A1 | 3/2017 | Oghena et al. |
| 2019/0136119 A1 | 5/2019 | Aslam et al. |
| 2019/0144737 A1 | 5/2019 | Morales et al. |
| 2019/0345377 A1* | 11/2019 | Haque ..................... C09K 8/80 |
| 2020/0190396 A1* | 6/2020 | Reyes ..................... C09K 8/86 |
| 2020/0392399 A1* | 12/2020 | Nguyen .................. C09K 8/40 |
| 2021/0002544 A1* | 1/2021 | Hahn ..................... E21B 43/17 |

FOREIGN PATENT DOCUMENTS

| | | |
|---|---|---|
| CA | 1180249 A | 1/1985 |
| WO | 2013116198 A1 | 8/2013 |

* cited by examiner

*Primary Examiner* — Silvana C Runyan
(74) *Attorney, Agent, or Firm* — Osha Bergman Watanabe & Burton LLP

(57) ABSTRACT

A formation treatment fluid may include a wettability alteration agent, a solvent, an injection gas, and an optional foaming agent. The wettability alteration agent may include a fluorinated surfactant, a silicon-based surfactant, charged nanoparticles partially modified with fluorine containing groups, or combinations thereof. Methods for altering a hydrocarbon-bearing reservoir surface wettability may include providing the formation treatment fluid, injecting the formation treatment fluid into the hydrocarbon-bearing reservoir, and recovering fluids produced from the hydrocarbon-bearing reservoir.

21 Claims, 6 Drawing Sheets

  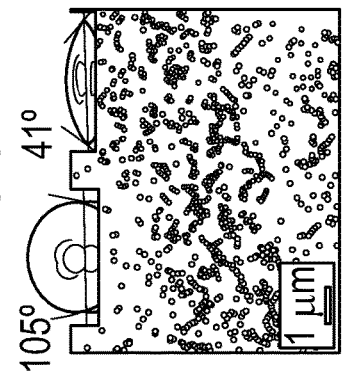
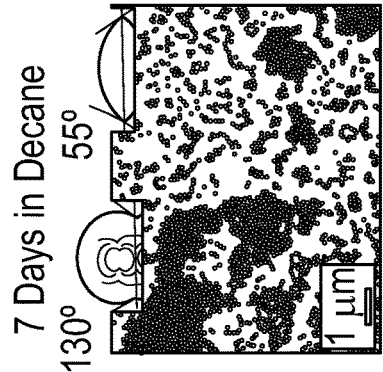 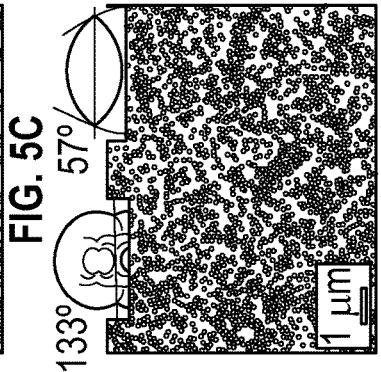 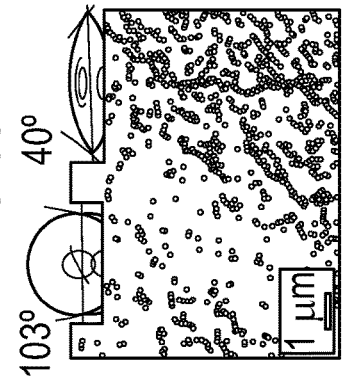
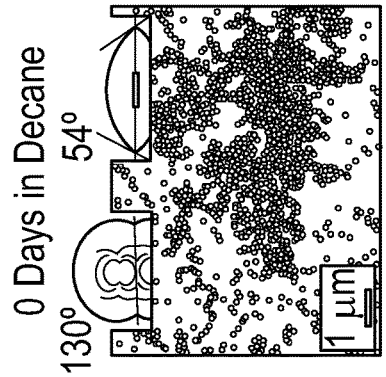 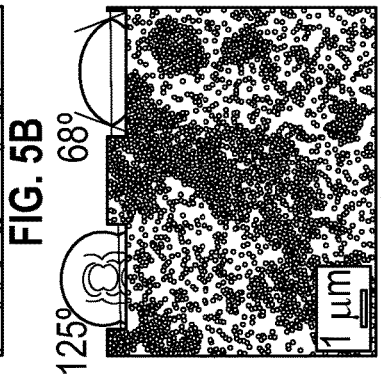 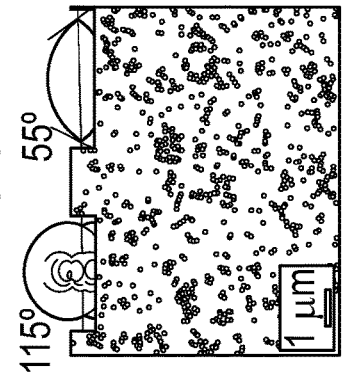
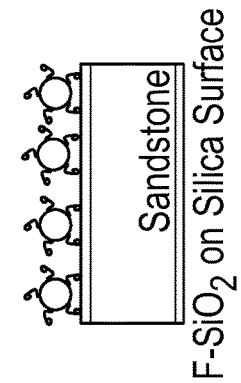 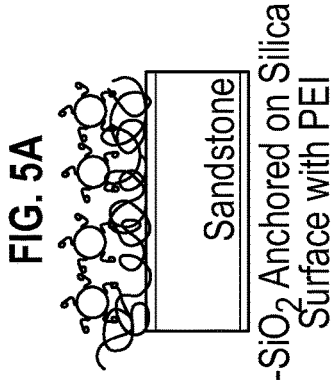

| Solvent | Methanol | 2butoxyethanol /butanol | 2-butoxyethanol | Pentanol | Butanol |
|---|---|---|---|---|---|
| Contact Angle @ 150° C, 4000 PSI | (L) 85.6<br>(R) 97.8 | (L) 93.0<br>(R) 99.9 | (L) 86.6<br>(R) 85.6 | (L) 94.0<br>(R) 100 | (L) 73.6<br>(R) 76.3 |
| Drop Image (Water) | 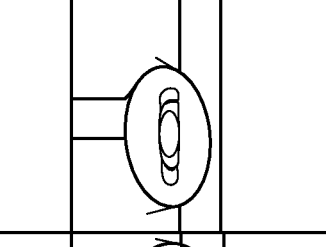 | 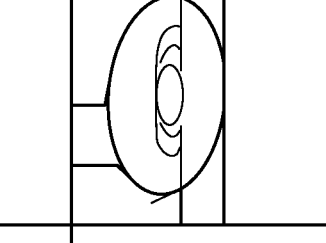 | 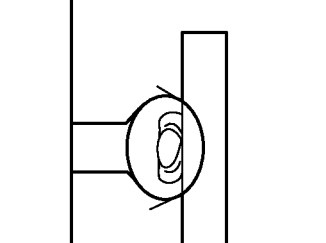 | 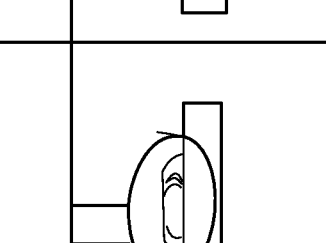 | 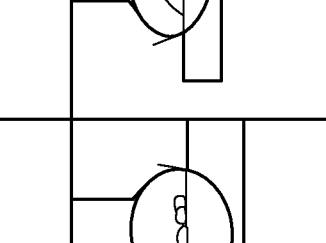 |
FIG. 6

FOAMED WETTABILITY ALTERATION TREATMENT FOR DEEP CONDENSATE AND WATER BLOCKAGE IN GAS RESERVOIRS

BACKGROUND

When the bottom-hole flowing pressure of a well drilled in gas-condensate reservoir drops below the dew point, liquid hydrocarbons in the form of condensate may accumulate near the wellbore area, forming a condensate bank. As the liquid hydrocarbon saturation in the near-wellbore region increases, the gas relative permeability is decreased, thus resulting in loss of productivity of both gas and condensate. Over time, the gas wells may accumulate condensate near the wellbore. In rich gas-condensate reservoirs having a permeability of less than 100 mD, condensate banks may form resulting from such accumulation, which further leads to a reduction in the gas relative permeability and, thus, the productivity of the well.

Several techniques have been used in wells with such condensate banks. These techniques may include gas cycling, drilling horizontal wells, hydraulic fracturing, acidizing, injection of super critical $CO_2$, and the use of solvents and wettability alteration chemicals. Gas cycling may keep the reservoir pressure higher than the dew point to reduce the liquid drop out. However, this method may be limited by the volumes of gas that can be recycled in the reservoir. For an ideal recycle, the gas volume injected into the reservoir should be larger than the total gas that may be produced from such a reservoir. Other approaches may include drilling horizontal wells and hydraulic fracturing where the pressure drop around the wellbore area is lowered to allow for a longer time of production before the reservoir pressure drops below the dew point. These approaches may be costly as they may require drilling rigs and they may be temporary solutions.

SUMMARY

Certain embodiments of the disclosure will be described with reference to the accompanying drawings, where like reference numerals denote like elements. It should be understood, however, that the accompanying figures illustrate the various implementations described and are not meant to limit the scope of various technologies described.

In one aspect, embodiments disclosed herein relate to formation treatment fluids including a wettability alteration agent, a solvent, an injection gas, and an optional foaming agent. The wettability alteration agent may include a fluorinated surfactant, a silicon-based surfactant, charged nanoparticles partially modified with fluorine containing groups, or combinations thereof.

In another aspect, embodiments disclosed herein relate to methods for altering a hydrocarbon-bearing reservoir surface wettability. These methods may include providing a formation treatment fluid including wettability alteration agent, a solvent, an injection gas, and an optional foaming agent, where the wettability alteration agent may include a fluorinated surfactant, a silicon-based surfactant, charged nanoparticles partially modified with fluorine containing groups, or combinations thereof. The methods may also include injecting the formation treatment fluid into the hydrocarbon-bearing reservoir. Additionally, the methods may include recovering fluids produced from the hydrocarbon-bearing reservoir.

Other aspects and advantages of this disclosure will be apparent from the following description made with reference to the accompanying drawings and the appended claims.

BRIEF DESCRIPTION OF DRAWINGS

FIGS. 5A-5L are schemes of three nanoparticles configurations (FIGS. 5A, 5E, and 5I) and contact angles of water and decane and SEM photographs (FIGS. 5B-5D, 5F-5H, and 5J-5L) on glass slides treated with treatment fluids containing solutions of samples of the corresponding nanoparticles.

FIG. 6 is a table of the contact angles of various solvents on the surface of a rock formation treated with a treatment fluid containing WS1200 formulations as a wettability alteration agent.

DETAILED DESCRIPTION

Figure 1A:
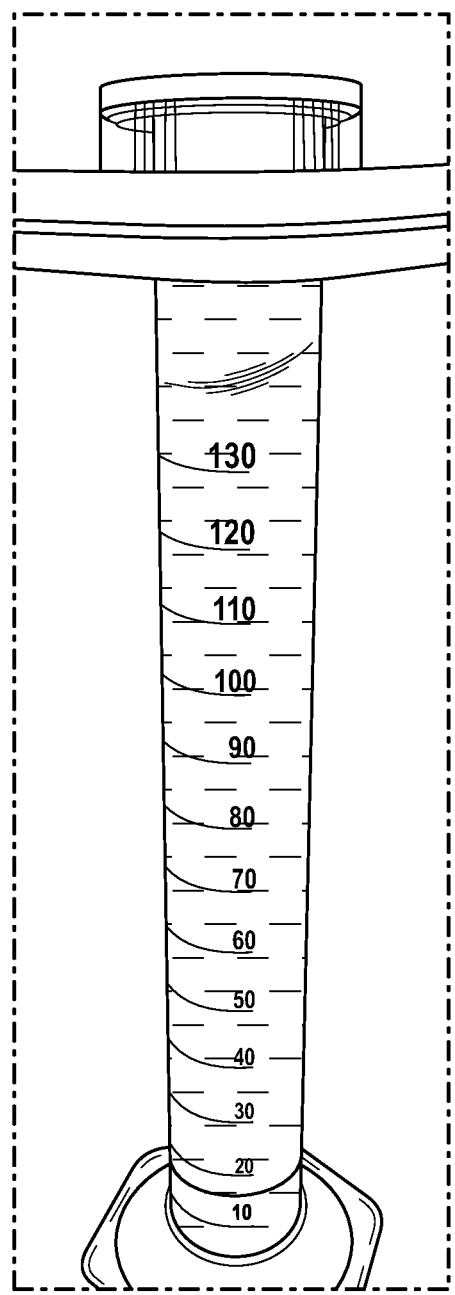
FIGS. 1A and 1B are drawings representative of photographs of the treatment fluid obtained in Example 1 taken 10 minutes (FIG. 1A) and 16 minutes (FIG. 1B) after mixing.

Several strategies have been employed to enhance gas and condensate productivities from a hydrocarbon reservoir. For example, the use of wettability alteration chemicals, such as fluorinated polymers and surfactants, dissolved in alcohol-based solvents may be effective in improving production in wells suffering condensate banking, by altering the wettability of surfaces within the hydrocarbon reservoir. In particular, the use of solvents may remove condensate banks around a wellbore by allowing gas flow to be unimpeded through the near-wellbore region, resulting in smaller drawdown and slower accumulation of condensate. However, solvents may not be durable, and the low flash point of some solvents, such as alcohol-based solvents, may present a hazardous source of fire and explosion, especially during summertime. Additionally, wettability alteration chemicals may be used to alter the wettability of surfaces of the hydrocarbon reservoir, and thus enhance gas and condensate productivities from the hydrocarbon reservoir. However, the use of certain wettability alteration chemicals may cause permanent damage to the reservoir.

Accordingly, there exists a need for improved treatment fluids including solvents and wettability alteration chemicals. Such treatment fluids may provide increased gas and condensate productivities from hydrocarbon reservoirs.

One or more embodiments of the present disclosure relate to compositions and methods for increasing the gas and condensate productivities from hydrocarbon reservoirs through the incorporation of a wettability alteration agent, an alcohol containing liquid, an injection gas, and an optional foaming agent, to form an energized foamed fluid system. Such a foamed fluid system may be used as a treatment fluid to penetrate reservoirs with efficient distribution of the fluid, particularly in the case of areas of high permeability and heterogeneous formations.

According to some embodiments, the treatment fluid may be a foamed fluid system, which may deeply penetrate the reservoir in the area around the wellbore as well as around the fracture surfaces, propped fracture surfaces and around the horizontal section of the well. This foamed wettability alteration treatment fluid may treat larger reservoir volumes using less volume of total treatment fluid. The foamed treatment fluid may thus enhance the distribution of the fluid in cases such as high permeability contrast and heterogenous formations.

More particularly, one or more embodiments relate to highly stable water- and/or alcohol-containing treatment fluids or foams and methods of forming and using such foams. The treatment fluids or foams may be used as carrier or treatment fluids in carrying out various processes. For example, foamed carrier and treatment fluids may be utilized in subterranean formation stimulation. The use of a foamed fluid in carrying out a well stimulation process allows a lower volume of liquid phase in the foam than in conventional fluids, and as a result, fluid loss to permeable subterranean formations encountered by the foam is decreased. Further, because of the expandable gas phase in the foam, the treatment fluid may be rapidly removed from a treated formation. Foamed fluids may be used to treat larger area of the reservoir that is suffering damage due to large accumulation of gas condensate as a result of the reservoir being under the dew point pressure. In well cleanup during well flowback, foams may be easily removed by the producing stream.

Specifically, one or more embodiments relate to a treatment fluid including a wettability alteration agent combined with a liquid solvent. The mixture of wettability alteration agent and solvent may be foamed with a gas to provide a stable foam. The stability of such a foam may be increased by including a viscosifying agent in the liquid phase prior to the foaming.

According to one or more embodiment, the wettability alteration agent may include a fluorinated surfactant, a silicon-based surfactant, a charged nanoparticle partially modified with fluorine containing groups, a particle suspension, or combinations thereof.

The treatment fluid may include from about 0.01 wt % to about 10.0 wt %, or from about 0.02 wt % to about 10.0 wt %, or from about 0.05 wt % to about 10.0 wt %, or from about 0.1 wt % to about 10.0 wt %, or from about 0.01 wt % to about 5.0 wt %, or from about 0.02 wt % to about 5.0 wt %, or from about 0.05 wt % to about 5.0 wt %, or from about 0.1 wt % to about 5.0 wt %, or from about 0.01 wt % to about 2.0 wt %, or from about 0.02 wt % to about 2.0 wt %, or from about 0.05 wt % to about 2.0 wt %, or from about 0.1 wt % to about 2.0 wt %, or from about 0.01 wt % to about 1.0 wt %, or from about 0.02 wt % to about 1.0 wt %, or from about 0.05 wt % to about 1.0 wt %, or from about 0.1 wt % to about 1.0 wt % of wettability alteration chemical based on the total weight of the treatment fluid.

The wettability alteration agent may include a fluorinated surfactant, which may provide an omniphobic surface after treating the rock. Examples of fluorinated surfactants may include non-ionic polymeric fluorochemical surfactants. More particularly, the fluorinated surfactants may include fluoroalkylsulfonates, fluoroalkylphosphates, fluoroaliphatic esters, or fluoroaliphatic amine oxides, fluoropolyether disulfates. Examples of fluorinated surfactants may include Novec® Fluorosurfactant FC 4432, FC 4430, FC-5120 (3M®, St Paul, Minn.), Zonyl® fluorosurfactants (DuPont®, Wilmington, Del.) Unidyne® (Daikin®, JP), Ceridust 3920 F (Clariant®, Switzerland), Fluorolink® (Solvay®. Brussels, Belgium). Zonyl 8740, G06, Zonyl FSN-100, FS-300, FS-500, Capstone FS-10, FS-30, FS-60, FS-61, FS-63, FS-64, FS-65. In some embodiments, the fluorinated surfactant may be present in the treatment fluid in an amount of from about 0.1 wt % to about 2.0 wt % based on the total weight of the treatment fluid.

The wettability alteration agent may include silicon-based surfactants. Examples of silicon-based surfactants may include polyether modified polysiloxanes. such as 3(3-hydroxypropyl)-heptamethyltrisiloxane, ethoxylated (3-hydroxypropyl)-methyl dimethyl siloxanes and silicones. In some embodiments, the silicon-based surfactant may be present in the treatment fluid in an amount of from about 0.1 wt % to about 2.0 wt % based on the total weight of the treatment fluid.

In some embodiments, the wettability alteration agent may optionally include additional surfactants, such as betaine-based surfactants, viscoelastic surfactants, polymeric surfactants, or combinations thereof. In some embodiments, the surfactants may include bis-PEG-[10-12] dimethocone.

In some embodiments, the wettability alteration agent may include a charged nanoparticle partially modified with fluorine containing groups. The charged nanoparticles may include metal oxides, organic nanoparticles resins, thermoplastic resins, silica, quartz, glass, titania, zirconia, germania, alumina, tantalum pentoxide, zinc oxide, carbon nanotube, graphene, carbon black, mica, graphite, talc, nanoclay, boron nitride, boron nitride nanotubes, vanadium pentaoxide, calcium carbonate, zirconium oxide, titanium oxide, silicon nitride, silicon carbide, copper, tin oxide, iron oxide, titanium oxide, chromium oxide, lead oxide, gypsum, barytes, metal organic frameworks, or combinations thereof. Additionally, the charged nanoparticles may include organic and thermoset resins, such as cross-linked polystyrene particles, crosslinked methacrylate-based polymers particles, phenolic resin (e.g., novolac or resole), a furan resin, an epoxy resin, a polyurethane, a polyurea, or a melamine, or combinations thereof. In some embodiments, the nanoparticles may be partially modified with fluorine-containing groups. For example, the nanoparticles may include fluorinated silica particles.

In some embodiments, the charged nanoparticles may have a mean diameter in a range of from about 1 nm to about 1000 nm, or from about 10 nm to about 1000 nm, or from about 100 nm to about 1000 nm, or from about 30 nm to about 1000 nm, or from about 30 nm to about 500 nm, or from about 1 nm to about 500 nm, or from about 1 nm to about 100 nm.

The charged nanoparticles may be present in a particle suspension in the treatment fluid in an amount ranging from about 0.001 wt % to about 10 wt %, or from about 0.01 wt % to about 10 wt %, or from about 0.05 wt % to about 10 wt %, or from about 0.1 wt % to about 10 wt %, or from about 0.1 wt % to about 1.00 wt %, or from about 0.001 wt % to about 1.00 wt %, or from about 0.01 wt % to about 1.00 wt %, or from about 0.05 wt % to about 1.00 wt %, or from about 0.01 wt % to about 5 wt %, or from about 0.01 wt % to about 1 wt % based on the total weight of the particle suspension.

In some embodiments, the charged nanoparticles may be present in a particle suspension. The charged particles can have a stable suspension of it which can have some water, surfactants, alcohols, pH adjusting buffers or active agents or other solvents. The amount of particles in this stock suspension solution can be from 1-20% by weight in the suspension. This suspension is then added to the treatment fluid to treat the formation. The amount of this suspension can be used in 0.1 to 10 volume % of the treatment fluid. The nanoparticles in the suspension may have a surface free energy less than 50 mJ/m$^2$. The charged nanoparticles may be partially modified with fluorine-containing groups. The charged particles may be present in the particle suspension in an amount that ranges from 0.01 wt % to 10 wt %, for example in the range of 0.02 wt % to 1.0 wt % based on the total weight of the particle suspension.

In some embodiments, the charged nanoparticles may be functionalized with a first chemical moiety (R) that may react with a second chemical moiety (R') on a surface of the rock formation to form at least one of a covalent bond, an electrostatic bond, or a Van der Waals bond. For example, a compound including chemical moiety (R') may be injected in a reservoir, followed by the injection of the charged nanoparticles functionalized with chemical moiety (R), resulting in a wettability altering composition according to one or more embodiments.

The first chemical moiety (R) may include a silyl ether group, an amine group, an aromatic amine, an ammonium group, a quaternary amine group, a polyamine, a silanol, an isocyanate, an epoxide, a hydroxyl, a phenol, a halogen, halosilanes, a carboxyl group, a carboxylate group, a phosphate group, a phosphonium group, a phosphonate group, a phosphine, a sulfonate group, a sulfate group, a sulfonic acid group, a pyridine group, a pyridinium group, a sulfur, a mercaptan, an aldehyde, a succinic anhydride, an ester group, a thiocynate, silyl hydrides, a methacryloxy group, an acrylamide group, an allyl group, zwitterionic groups, or combinations thereof.

The second chemical moiety (R') may include a hydroxyl group, an amine group, a metallic oxide group, metallic carbonate groups, silicate groups, a polyamine, a quaternary amine group, an epoxide, an isocyanate, a silyl ether group, an aromatic amine, an ammonium group, a silanol, an isocyanate, a phenol, a halogen, halosilanes, a carboxylic acid, a carboxylate group, a phosphate group, a phosphonate group, a phosphine, a sulfonate group, a sulfate group, a sulfonic acid group, a pyridinium group, a sulfur, a mercaptan, an aldehyde, a succinic anhydride, an ester group, a thiocynate, silyl hydrides, a methacryloxy group, an acrylamide group, an allyl group, or combinations thereof.

In particular, the first chemical moiety (R) may be an epoxide group and the second chemical moiety (R') may be an amine group. In some cases, the first chemical moiety (R) may be a silyl ether group, an amine group, quaternary amine group, pyridine group, epoxide group, isocyanate group, aromatic amine, ammonium group, polyamine group, halogen group, halosilane group, or an aldehyde group, and the second chemical moiety (R') may be a hydroxyl group.

The first chemical moiety (R) may be an epoxide that reacts with the amine group provided by the amino-alkyl silane to form a covalent bond. The particles may be functionalized with perfluorooctyltriethoxysilane, perfluorooctyltrichlorosilane, nanofluorohexyltrichlorosilane, tridecafluoro-1,1,2,2-tetrahydrooctyltrichlorosilane, heptadecafluoro-1,1,2,2-tetrahydrodecyltrichlorosilane, 1H, 1H,2H, 2H-perfluorodecyltriethoxysilane and perfluorodecyltrichlorosilane. Alternatively, or additionally, the particles are functionalized with chemical moiety L that includes a hydrophobic moiety, oleophobic moiety or omniphobic moiety. The L moiety contains at least one of a group containing linear or branched alkyl containing group, an alkylaryl containing group, an aromatic containing group, a fluoroalkyl containing group, a perfluoroalkyl containing group, an organic silicon containing group or a combination thereof. The hydrocarbon or alkyl chain length may include more than 5, 7, 9, 10, 12, 14, 15, 20, or 22 carbons.

In some embodiments, the charged nanoparticles may be functionalized with 3-(2-aminoethyl)-aminopropyltrimethoxysilane, aminopropyltriethoxysilane, trimethoxysilylpropyl modified (polyethylenimine), dimethoxysilylpropyl modified (polyethylenimine), triethoxysilylbutyraldehyde (an aldehyde functional silane), 4-aminobutyltriethoxysilane, N-(2-aminoethyl)-3-aminopropyltrimethoxysilane, p-aminophenyltrimethoxysilane, N-(2-aminoethyl)-11-aminoundecyltrimethoxysilane (an aliphatic and aromatic amino functional silane), 2-(4-pyridylethyl)triethoxysilane (an pyridine functional silane), N-(2-aminoethyl)-3-aminopropylsilanetriol (an amino functionalized silanol), N,N-dimethyl-3-aminopropylmethyldimethyoxysilane (an secondary amine functionalized silane), octadecyldimethyl(3-trimethoxysilylpropyl)ammonium chloride (an quaternary amine functionalized silane), bis(3-triethoxysilylpropyl)amine (a dipodal amine functionalized silane), aminoethylaminopropylsilsesquioxane, 3-triethoxysilyl) propylsuccinic anhydride (an anhydride functional silane), carboxyethylsilanetriol disodium, N-(trimethoxysilylpropyl)ethylenediaminetriacetate, tripotassium salt (an carboxylic acid functionalized silane), 2-(4-chlorosulfonylphenyl) ethyltrimethoxysilane (a sulfonate functionalized silane), 3-(glycidoxypropyl)trimethoxysilane (an epoxy functionalized silane), 4-bromobutyltrimethoxysilane (a halogen functionalized silane), N-(hydroxyethyl)-N-methylaminopropyltrimethoxysilane (an hydroxyl functional silane), 3-isocynatopropyltriethoxysilane (an isocyanate functional silane), 3-(trihydroxysilyl)propyl methylphosphonate monosodium salt (a phosphonate functionized silane), 3-mercaptopropyltrimethoxysilane (a mercapto functionalized silane), 3-thiocyanatopropyltriethoxysilane (a thiocynate functionalized silane), bis(3-(triethoxysilyl)propyl)disulfide (a disulfide functionalized silane), 1,2-bis (triethoxysilyl)ethane hexaethoxydisilethylene (a di-functional silane), γ-(methacryloxy)propyltrimethoxysilane, 3-acrylamidopropyltrimethoxysilane, 2-(chloromethyl)allyltrimethoxysilane, or allyltrimethoxysilane. The fluorosilane solution mixture may include at least one of perfluorooctyltriethoxysilane, perfluorooctyltrichlorosilane, nanofluorohexyltrichlorosilane, tridecafluoro-1,1,2,2-tetrahydrooctyltrichloro silane, heptadecafluoro-1,1,2,2-tetrahydrodecyltrichlorosilane, 1H,1H,2H,2H-perfluorodecyltriethoxysilane, or perfluorodecyltrichlorosilane.

Liquids used as the liquid phase in the treatment fluids or foams according to one or more embodiments may include one or more solvents. These solvents may include water, hydrocarbons, aqueous alcohol solutions, or any combination thereof. In particular, one or more alcohols, solvents or glycols may be used in the liquid phase of foamed fluids used in subterranean formation treatments according to one or more embodiments where the subterranean formation is sensitive to the intrusion of water foreign to the formation. Such water-sensitive formations may contain clays which may be irreparably damaged upon foreign water contact due to the swelling of the clays and/or the migration of fines as a result thereof. The swelling of clays and/or migration of fines may be less likely when contacted by alcohol or an aqueous alcohol solution containing a high alcohol content. In addition, lower formation capillary pressures may result when alcohol-containing fluids are used as both the viscous structuring of water (on silicate surfaces) is less likely, and the interfacial tension is reduced. This results in deeper penetration into the formation of the same non-foamed treatment volume and in a faster and more complete cleanup of the formation after the treatment is carried out. Other factors that may result in quickly achieving production capacity of a subterranean formation treated with high alcohol content fluids are the higher vapor pressure of alcohol fluids and the partial miscibility of oil and alcohol.

As such, the solvent mixture used in the treatment fluid according to one or more embodiments may include a solvent, such as an alcohol. In particular, the treatment fluid may include from about 20.0 wt % to about 40.0 wt % of an alcohol, based on the total weight of the blended compound. The alcohol may include ethylene glycol, n-butanol, 2-butoxyethanol, butyl carbitol, 1-pentanol, 1-hexanol, 2-butoxyethanolterpineol, geraniol, citronellol, nerol, menthol, nerolidol, turpentine, D-limonene, farnesol, or combinations thereof.

In some embodiments, the treatment fluid may include water, which may include freshwater, deionized water, low salinity water, high salinity water, well water, filtered water, distilled water, sea water, saltwater, brine, or mixtures thereof.

The treatment fluid may include from about 5.0 wt % to about 99.0 wt %, or from about 5.0 wt % to about 95.0 wt %, or from about 5.0 wt % to about 90.0 wt %, or from about 10.0 wt % to about 99.0 wt %, or from about 10.0 wt % to about 95.0 wt %, or from about 10.0 wt % to about 90.0 wt %, or from about 20.0 wt % to about 99.0 wt %, or from about 20.0 wt % to about 95.0 wt %, or from about 20.0 wt % to about 90.0 wt % of solvent based on the total weight of treatment fluid.

The solvent may provide an increase in the relative permeability of gas within the hydrocarbon reservoir and the solvent mixture is selected to provide a chemical treatment composition with a flash point of at least 50° C. (122° F.). The wettability alteration chemical is operable to alter the wettability of reservoir surfaces of the hydrocarbon reservoir to an intermediate wet or gas wet condition.

In some embodiments, the treatment fluid may include an injection gas. The injection gas may include air, nitrogen ($N_2$), carbon monoxide (CO), carbon dioxide ($CO_2$), natural gas, or mixtures thereof.

In some embodiments, the treatment fluid may optionally include a foaming agent. The foaming agent may include a nonionic surfactant or mixture of nonionic surfactants, a cationic surfactant or a mixture of cationic surfactants, an amphoteric surfactant or a mixture of amphoteric surfactants, or an anionic surfactant or a mixture of anionic surfactant. Examples of foaming agent may include surfactant, for example, water-soluble, nonionic, anionic, cationic, and amphoteric surfactants; betaine-based surfactants, viscoelastic surfactants; polymeric surfactants, for example, partially hydrolyzed polyvinyl acetate; partially hydrolyzed modified polyvinyl acetate; block or copolymers of polyethylene, polypropylene, polybutylene and polypentene; proteins; partially hydrolyzed polyvinyl acetate, polyacrylate, and derivatives of polyacrylates; polyvinyl pyrrolidone and derivatives thereof; or combinations thereof. The foaming agent may be present in the treatment fluid in an amount ranging from about 0.1 wt % to about 2.0 wt %, or from about 0.5 wt % to about 1.5 wt %, or from about 0.8 wt % to about 1.2 wt % based on the total weight of the treatment fluid.

In some embodiments, a fluorinated surfactant such as those previously described may be used as foaming agent. Additionally, in some embodiments, the added functionalized nanoparticles previously described may also improve the stability of the foam in the treatment fluid.

An example of treatment fluid may include a primary surfactant, a secondary surfactant, a foam stabilizer, a solvent, and optional components. For example, the treatment fluid may include the following components in the corresponding amounts:

0.01-5.0 wt % of bis-PEG-[10-12] dimethocone (primary surfactant);
0.01-1.0 wt % of cocoamidopropylbetaine (secondary surfactant);
0.05-1.0 wt % of cetyl betaine (foam stabilizer);
10-90 wt % of 2-butoxyethanol or glycol ethers or propylene glycol or butanol or ethanol or a mixture of two or more; and
10-90 wt % water.

In some embodiments, the treatment fluid may be used in rock formations, such as sandstone formations, carbonate formations, shale formations, clay-rich formations, or a combination thereof. The treatment fluid may be pumped into an unpropped fracture, a propped fracture, a gravel packed completion, a reservoir matrix, or a combination of thereof.

The wettability of a rock surface may be determined based on the value of the contact angle between a fluid and the rock surface. If the contact angle is less than 90°, the fluid is wetting, if the contact angle is greater than 90°, the fluid is non-wetting, and if the contact angle is equal to 90°, the fluid is neutral wetting. In some embodiments, the contact angle of deionized water on a surface of a chemically treated rock formation is in a range of about 60° to about 160°, about 90° to about 160°, or about 120° to about 160°. In another embodiment, the contact angle of the water is about 90° to about 110°. In various embodiments, the water may be fresh water, deionized water, low salinity water, high salinity water, or an aqueous 2-6 weight % potassium chloride (KCl) solution. In some embodiments, the contact angle of an aqueous 2 weight % KCl solution on a surface of a chemically treated rock formation is in a range of about 60 to about 160 degrees, about 90° to about 160°, or about 120° to about 160°. In another embodiment, the contact angle of the aqueous solution is about 90° to about 110°. In some embodiments, the contact angle of decane on a surface of a chemically treated rock formation is in a range of about 40° to about 160°, about 45° to about 160°, or about 50° to about 160°. In another embodiment, the contact angle of the decane is about 70° to about 90°.

In some embodiments, the present disclosure relates to methods of treating or altering the wettability of the rock surface a hydrocarbon-bearing reservoir. The methods may comprise providing a treatment fluid containing a wettability alteration agent, a solvent, an injection gas, water, and optionally a foaming agent. The wettability alteration agent may be selected from the group consisting of a fluorinated surfactant, a silicon-based surfactant, a charged nanoparticle partially modified with fluorine containing groups, and combinations thereof. The methods may further include injecting the treatment fluid into the hydrocarbon-bearing reservoir and recovering fluids produced from the hydrocarbon-bearing reservoir.

The treatment methods according to some embodiments may include a pre-flush step to prepare the rock surface to receive the wettability alteration treatment. The pre-flush step may include injecting a pre-flush treatment that may comprise a solvent, water, KCl-brines, or a rock surface modifier that comprises the second chemical moiety R' previously described, dispersed in a solvent. The solvent may include water, brine, methanol, ethanol, isopropanol, ethylene glycol, butanol, 2-butoxyethanol, butyl carbitol, pentanol, hexanol, terpene alcohols (such as terpineol, geraniol, citronellol, nerol, menthol, nerolidol, turpentine, D-limonene, and farnesol), propylene glycol, propylene carbonate, ethylene carbonate, mono-ethylene glycol, di-ethylene glycol, ethylene glycol monobutylether, di-propylene glycol, tri-ethylene glycol, or combinations thereof. The pre-flush treatment may contain a rock surface modifier that comprises chemical moiety R' previously described suspended in fresh or deionized water, 2 wt % KCl, 6 wt % KCl, an alcohol and a solvent from the above group or a combination of thereof. The pre-flush treatment may also include aqueous solutions including chelating agents including ethylenediaminetetraacetic acid (EDTA), methylglycinediacetic acid trisodium salt (MGDA), N,N-dicarboxymethyl glutamic acid tetrasodium salt (GLDA), hydroxyethylethylenediaminetriacetic acid (HEDTA), or combinations thereof. In these aqueous solutions of pre-flush treatment, the chelating agent may have a concentration of from about 0.1 wt % to about 40 wt % based on the total weight of the pre-flush treatment solution. Pre-flush is utilized if there is incompatibility between formation water and the treatment. In that case the surfactant in the treatment can precipitate out. In other cases some treatment wetting altering chemicals react with formation to better extent in absence of water. In that case alcohol flush is needed to drive water into the formation. Pre-flush is also needed if the formation surface is covered with wax, asphaltene or other materials that will prevent the reaction of wettability agent with the formation. In those cases pre-flush of solvents that dissolve the wax or asphaltenes is required.

The pre-flush step may be performed in one stage where a pure solvent, fresh water, alcohol, KCl brine, or a mixture of thereof is injected. The pre-flush does not contain the surface wettability modifier. The surface wettability modifier may be part of the main treatment performed after the pre-flush. The pre-flush may be performed in two stages, where the first stage is a mixture of solvent and aqueous solutions in a ratio of 95/5, 90/10, 85/15, 80/20, 75/25, 70/30, 65/35, or 60/40 to mix and displace the formation brine deeper into the formation followed by a second stage where a pure solvent is injected.

In some embodiments, the step of injecting the treatment fluid may include introducing the treatment fluid into the hydrocarbon-bearing reservoir via coiled tubing or bullheading in a production tube.

In some embodiments, in these methods, the fluid treatment may be in contact with the hydrocarbon-bearing reservoir surface for a time ranging from about 30 minutes to about 24 hours, or from about 60 minutes to about 12 hours, or from about 90 minutes to about 10 hours, or from about 120 minutes to about 7 hours, or from about 180 minutes to about 5 hours.

In some embodiments, the methods may further include recovering and producing hydrocarbons from the hydrocarbon-bearing reservoir.

EXAMPLES

The following examples are merely illustrative and should not be interpreted as limiting the scope of the present disclosure.

Standard Test Method for Foam in Aqueous Media (Blender Test)

This test method used in the following examples included the measurement of the increase in volume of a low-viscosity aqueous liquid due to its tendency to foam under high shear conditions.

According to this test method, an increase in volume was determined by the increase in total height of test fluid including foam after blending for 30 seconds (s) using a commercial-type blender with glass jar at 25° C. (77° F.) agitating between 4000 and 13000 revolutions per minute (rpm). The preferred range being 8000 rpm.

Foam Testing Procedure

The foam testing procedure used in the following examples included the following steps:
- Clean and rinse the blender with distilled water,
- Prepare 200 ml of foam or emulsion at the recommended use concentration,
- Pour the test liquid into a clean glass bottle or jar and store it at 25° C. (77° F.) for a minimum of 1 hour and a maximum of 2 hours,
- Assemble the blender,
- Attach a millimeter ruler to one side of the blender so that the 0 mm matches with the inside bottom of the blender jar,
- Pour the test liquid into the blender jar,
- Using any suitable thermometer, measure and record the temperature of this liquid,
- Measure and record the test liquid height, disregarding any foam, to the nearest 1 mm (this indicated the initial height, I),
- Blend for 30 sec at between 4000 and 13 000 rpm,
- Shut off the blender and immediately measure the total height (including foam). This is called maximum total height at zero time,
- Allow the blender to stand undisturbed and record the time (to the nearest ½ min) for the foam to subside to a net foam height of 10 mm,
- Record the total height to the nearest 1 mm as residual total height after 5 min if the foam height at this time exceeds 10 mm,
- Record the time at which 50% of liquid separates from foam and record this value as the half-lifetime of the foam.

Evaluation of Foam Stability

The stability of the foam was measured using the foam half-life time. The half-life time of a foam is defined as the time required by a foam to drain 50% of the volume of the initial conditioning liquid used in foam generation. Stable foams useful in the oil and gas industry have a foam half-life of 15 minutes or more.

Example 1

Figure 1B:
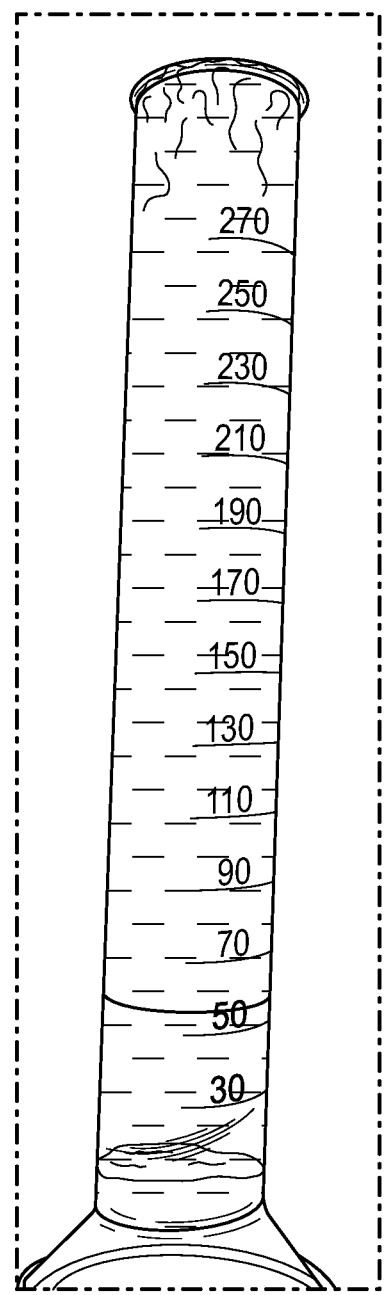

Fluorinated polymer surfactant WS-1200® (available from 3M Fluorochemicals, Minnesota, USA) (4 vol %) was added to water (96 vol %) to provide a solution having a total liquid volume of 100 mL in a graduated cylinder. The height of the liquid mixture was measured before foaming. The volume of water was 96 mL and the volume of the fluorinated polymer surfactant was 4 mL. After addition of the surfactant into the water in the blender, the solution was mixed for 30 seconds at a speed of 7500 rpm. After the mixing, the resulting fluid was immediately poured in a graduated cylinder and the maximum height was measured. Drawings representative of photographs taken of the obtained foamed sample after 10 min and 16 min are shown in FIGS. 1A and 1B, respectively.

The maximum and original liquid heights were used to calculate the foam height as below.

Foam height=maximum height−original height=17.7 cm−6.4 cm=11.3 cm.

Increase in volume of fluid after foaming=(270/100)*100=270% or 2.7 times.

The half-life is the time needed to have 50% separation of the liquid phase.

The half-life of the foam was 16 minutes.

This passed the criteria for stable foam of 15 minutes or more.

Example 2

Figure 2A:
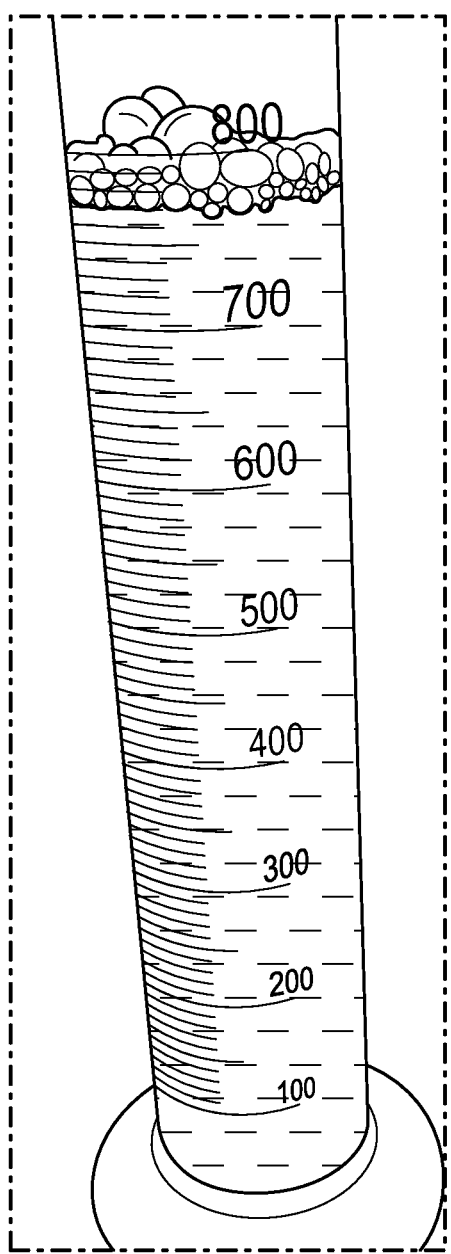
FIGS. 2A and 2B are drawings representative of photographs of the treatment fluid obtained in Example 2 taken 9 minutes (FIG. 2A) and 38 minutes (FIG. 2B) after mixing.
Figure 2B:
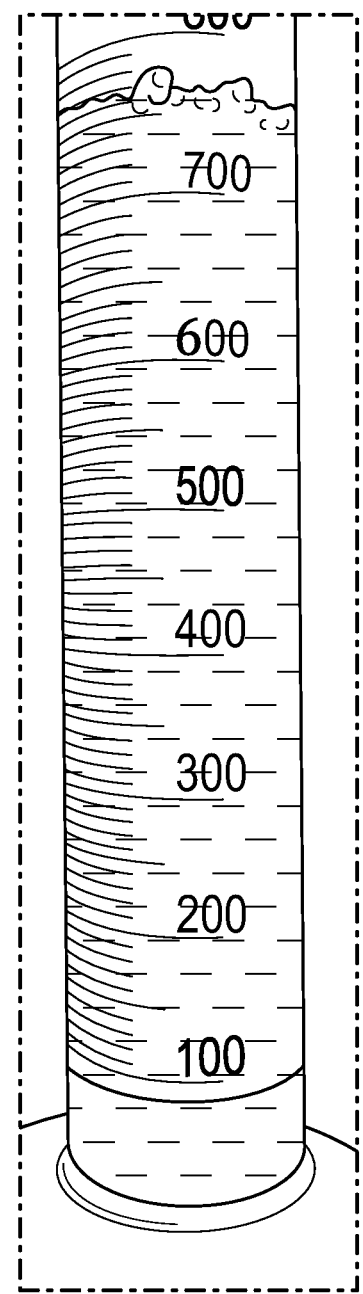

Fluorinated polymer surfactant WS-1200® (4 vol %) was added to water (96 vol %) to provide a solution having a total liquid volume of 200 mL in a graduated cylinder. The height of the liquid mixture was measured before foaming. The volume of water was 192 mL and the volume of the fluorinated polymer surfactant was 8 mL. After addition of the surfactant into the water in the blender, the solution was mixed for 30 seconds at a speed of 7500 rpm. After the mixing, the resulting fluid was immediately poured in a graduated cylinder and the maximum height was measured. Drawings representative of photographs taken of the obtained foamed sample after 9 min and 38 min are shown in FIGS. 2A and 2B, respectively.

The maximum and original liquid heights were used to calculate the foam height as below.

Foam height=maximum height−original height=24.6 cm−6.3 cm=18.3 cm.

Increase in volume of fluid after foaming=(780/200)*100=390% or 3.9 times.

The half-life is the time needed to have 50% separation of the liquid phase.

The half-life of the foam was 38 minutes.

This passed the criteria for stable foam of 15 minutes or more.

Example 3

Foaming agent Morflo III® (available from Halliburton, USA) (2 vol %) was added to water (98 vol %) to provide a solution having a total liquid volume of 200 mL in a graduated cylinder. The height of the liquid mixture was measured before foaming. The volume of water was 196 mL and the volume of foaming agent was 4 mL. After addition of the surfactant into the water in the blender, the solution was mixed for 30 seconds at a speed of 7500 rpm. After the mixing, the resulting fluid was immediately poured in a graduated cylinder and the maximum height was measured.

The maximum and original liquid heights were used to calculate the foam height as below.

Foam height=maximum height−original height=18.9 cm−6.3 cm=12.6 cm.

Increase in volume of fluid after foaming=(600/200)*100=300% or 3 times.

The half-life is the time needed to have 50% separation of the liquid phase.

The half-life of the foam was 3 minutes and 15 seconds.

This did not pass the criteria for stable foam of 15 minutes or more. Thus, the use of only a foaming agent in a treatment fluid did not provide a foaming system suitable for use as a wettability alteration treatment for gas-condensate reservoirs.

Example 4

Table 1 provides the results obtained from additional treatment fluid examples prepared using various surfactants, a solvent and air. The corresponding half-life times and volume increases were measured similarly to those of Examples 1-3.

TABLE 1

| Surfactant | Solvent | Was a stable foam formed? | Half-Lifetime | Volume Increase |
|---|---|---|---|---|
| Dynasylan® F8261[1] 20 gpt | Water | No | — | — |
| Dynasylan® F9896[2] 20 gPt | Waters | No | — | — |
| Capstone™ FS-22[3] 20 gpt | Water | No | — | — |
| Capstone™ FS-83[4] 20 gpt | Water | No | — | — |
| Capstone™ ST-300[5] 20 gpt | Water | No | — | — |
| Terravis™ N-200[6] 20 gpt | Water | No | — | — |
| Soloterra™ 988[7] 20 gpt | Water | No | — | — |
| Soloterra™ 941[8] 20 gpt | Water | No | — | — |
| EmulDAC 251[9] 20 gpt | Waters | No | — | — |
| NW-100[10] 20 gpt | Waters | No | — | — |
| Halliburton Foamer 20 gpt[11] | Waters | Yes | 3 m 15 s | 3 times |
| Halliburton Foamer 10 gpt[12] | Water | Yes | 2 m | 2 times |
| Poly Suga®Nate 100 NC 10 gpt[13] | Water | Yes | 6 m 40 s | 3.5 times |
| Suga®Nate 100 NC 10 gpt[14] | Waters | Yes | 9 m | 4.5 times |
| Cola®Lipid C 10 gpt[15] | Water | Yes | 5 m 30 s | 3.6 times |
| CBS 10 gpt[16] | Water | Yes | 5 m | 4 times |
| Suga®Nate 160 NC 10 gpt[17] | Water | Yes | 1 m 15 s | 1.8 times |
| WS-1200® 4 vol % or 40 gpt[18] | Water/2butoxy-ethanols (50/50) | Yes | 6 m | 1.7 times |

[1-2]Available from Evonik Corporation, USA.
[3-5]Available from The Chemours Company FC, LLC, USA.
[6-8]Available from Sasol Performance Chemicals, Germany.
[9]Available from Sasol, South Africa.
[10]Available from VerdeChem Technologies INC. Okotoks, Alberta, Canada.
[11-12]Available from Halliburton, USA.
[13-15,17]Available from Colonial Chemical, USA.
[16]Cola®Terric Sultaine, available from Colonial Chemical, USA.
[18]Available from 3M Fluorochemicals, USA.

Table 1 shows that the use of fluorinated surfactants foamed in the presence of water or alcohol solvent and an injection gas such as air result in stable foams suitable for enhancing gas and condensate productivities from hydrocarbon reservoirs.

Example 5

Figure 3:
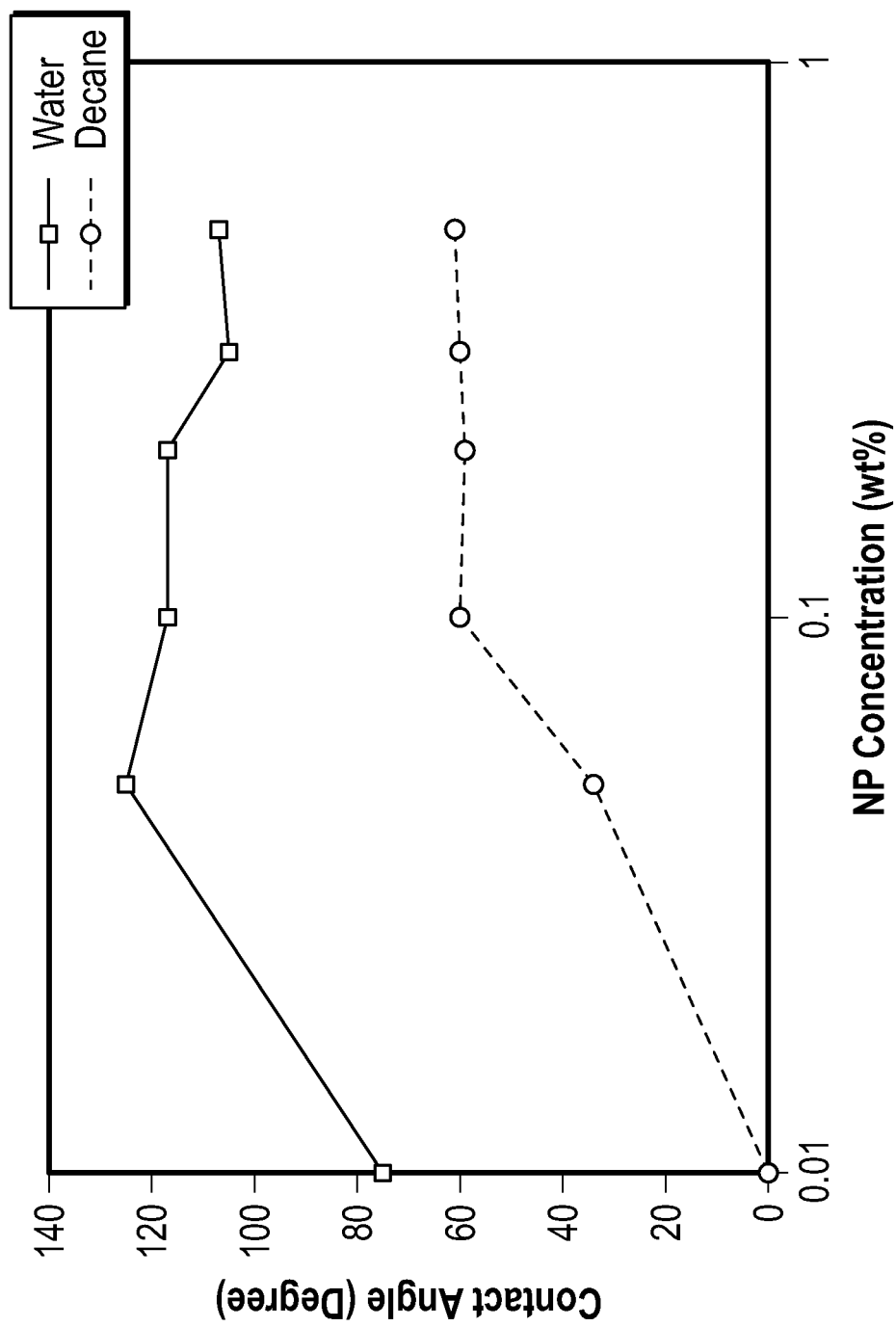
FIG. 3 is a graph showing the contact angles of water and decane on the surface of a rock formation treated with a treatment fluid containing charged nanoparticles partially modified with fluorine containing groups as a wettability alteration agent in concentrations of 0.01 to 1 wt %.

To further investigate the correlation between nanoparticles (NPs) concentration and coating efficiency, 50 mL of 0.01 wt % to 0.5 wt % NPs in butanol solution were used to coat a piece of glass microscope slide. The wettability of functionalized silica nanoparticles was studied through contact angle measurement at ambient condition. Glass microscope slides were used instead of Berea sandstone for their ease of contact angle measurement. The contact angles are shown in FIG. 3. An optimal water contact angle was measured at glass slide coated with 0.05 wt % PEI, F—$SiO_2$ NPs at 126°, and decane contact angle reached saturation at 0.1 wt % NPs solution with around 62° contact angle. The difference in the contact angle can be attributed to the roughness difference. Before the glass slide was densely and uniformly coated with NPs, the higher roughness created higher contact angle for water. However, with the saturation of NPs on glass slide and the NPs becoming more densely packed, the scale of roughness decreased, making the surface less decane-wet.

Example 6

Figure 4:
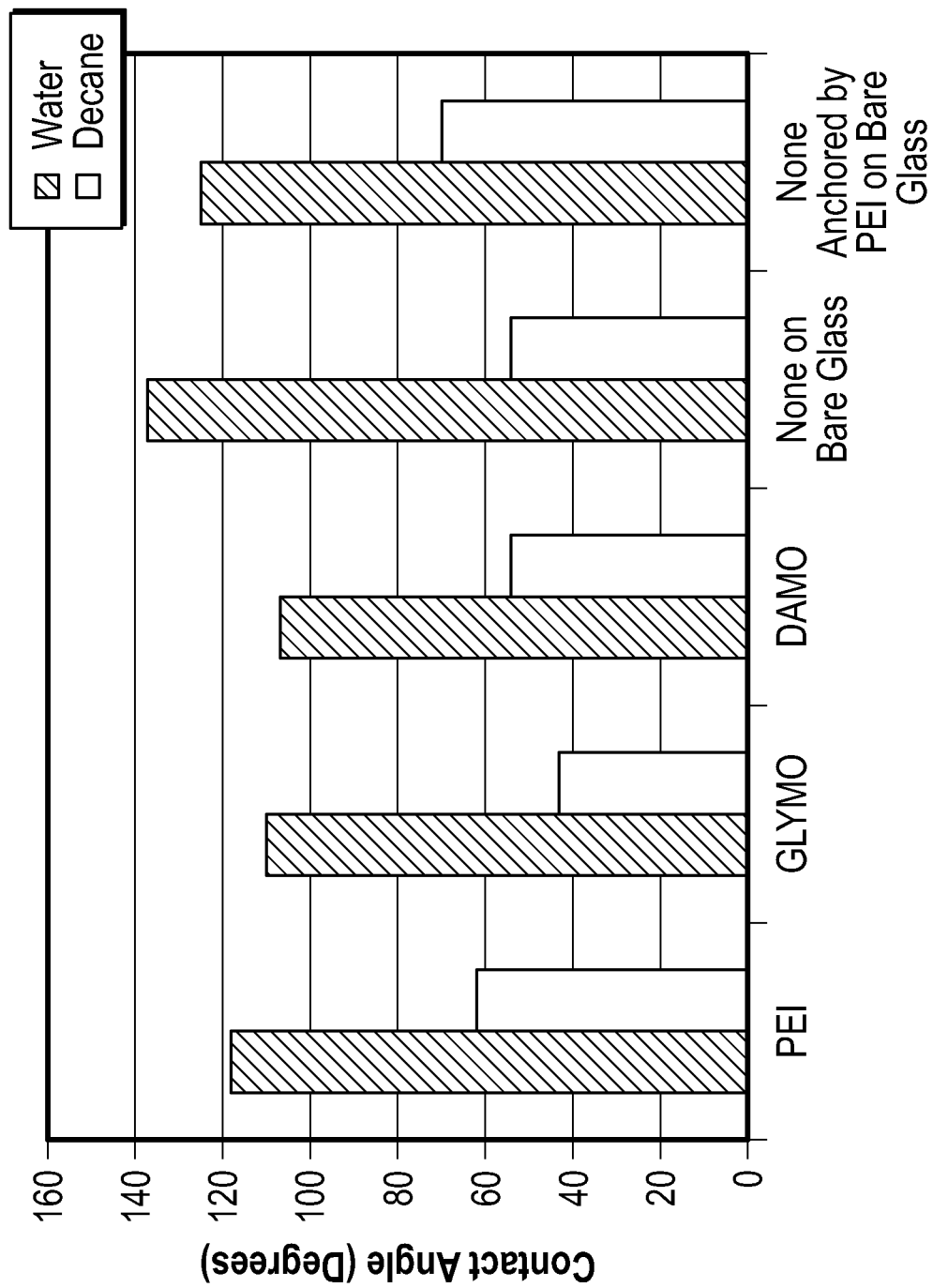
FIG. 4 is a bar graph showing the contact angles of water and decane on the surface of a rock formation treated with a treatment fluid containing charged nanoparticles partially modified with fluorine containing groups as a wettability alteration agent in the presence of various coupling agents.

Different coupling agents were also studied for their influence on the wettability alteration of the fluorinated NPs. FIG. 4 is a bar graph showing the contact angles of water and of decane on the surface of glass treated with a treatment fluid containing charged nanoparticles functionalized with polyethylenimine (PEI), [3-(2,3-Epoxypropoxy)propyl] trimethoxysilane (GLYMO), N-(3-(trimethoxysilyl)propyl) ethylenediamine (DAMO), as a wettability alteration agents. Glass slides with F—SiO2 prepared through the 2-step process yielded the highest decane contact angle of 70°. PEI, F—SiO2 NPs ends second at 62°. DAMO, F—SiO2 and F—SiO2 dip coated on bare silica substrate have identical decane wettability with a contact angle of 54°. F—SiO2 dip coated on bare silica substrate yields the highest water contact angle at 137°, possibly due to more exposed fluorinated area without the presence of any coupling agents. All other NPs give comparable water contact angle between 107° and 125°. Despite GLYMO, F—SiO2 gives decent performance in wettability alteration, it was not further studied due to gelling with time.

Example 7

Corrosion resistance measurements for functionalized NPs (F—SiO$_2$-NPs, PEI-NPs, PEI-F-NPs) were performed on NP coated glass slides. FIGS. 5A, 5E, and 5I are schemes of the three nanoparticles configurations respectively. and contact angles of water and decane and. Contact angles were measured on the NPs coated glass slides after soaking in decane and HTDS (high total dissolved solid) brine for 1 and 7 days. SEM was also conducted on the glass slides after 7 days of corrosion. SEM photographs of the corresponding samples are shown in FIGS. 5B-5D, 5F-5H, and 5J-5L. Before being challenged in any corrosive solutions, glass slides coated with F-functionalized nanoparticles had higher water contact angle of 137.7° as compared to 115.1° of PEI-F-NPs. Decane contact angles of PEI-F-NPs and F-NPs were comparable to each other. NP coatings have high tolerance towards oil environments as the contact angles for all nanoparticles decreases minimally after the first twenty-four hours of soaking in decane and remained constant over the next few days.

However, F—SiO$_2$-NPs directly deposited onto the silica substrate showed a rearrangement after soaking in decane, indicating that without any coupling agents there is a loose attachment between the nanoparticles and the substrate. Over 7 days of soaking in high total dissolved solids (HTDS) brine; however, both water and decane contact angle of F-NPs decreased drastically, due to the destruction of the nanoparticle structure by HTDS brine. Liquid droplet dropped on the corroded glass slide showed a trace while sliding off, indicating the absence of hydrophobic/omniphobic nanoparticles on the substrate. SEM images conducted on the damaged remains of the NPs shows a hollow shell of the NPs, possibly due to the dissolution of the NPs in the presence of HTDS brine through exposed spots on NP surface and through the NP core. The silica substrate also showed signs of corrosion in HTDS brine. The same corrosion was also observed on F—SiO$_2$-NPs anchored on silica surface with PEI. Damaged NPs left a ring of PEI on the substrate. The decrease of water contact angle for PEI, F-NPs was milder as compared to F-NPs. The coating of NPs on substrate remained uniform as liquid sliding off the plane left no trace. Clean sliding of liquid on the surface helped mitigating condensate banking under reservoir condition. SEM images of the surface also revealed the double-coated NPs' resistance towards corrosion by HTDS brine and a relatively constant distribution is found before and after corrosion in HTDS brine.

Example 8

The change of the wettability of the sandstone rocks after treating them with the tested formulations was evaluated through measuring the contact angle between water and the rock surface. The rock surface was treated first with the wettability alteration treatment fluid, and then the treated sample was transferred to the DSA100 for contact angle measurements. These measurements were obtained by placing the rock sample in the DSA100 cell. This was followed by increasing the temperature of the cell to 300° F. and the pressure (using nitrogen gas) to 4000 psi. The pressure and temperature were maintained until stability was achieved. Water was then injected from the droplet phase pump and droplets were made and created on the rock surface. The droplet was hanged by the needle (Sessile drop) and the right and left contact angles were measured. Certain of the tested formulations were able to change the contact angle from 10° (strong water wetting) to 115°, which is non wetting for water or preferentially gas wetting. FIG. 6 shows a summary of the contact angles values measured under reservoir conditions and corresponding images using methanol, 2-butoxethanol/butanol, 2-butoxyethanol, pentanol, and butanol, on a glass surface treated with a treatment fluid containing WS1200 as a wettability alteration agent.

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

The invention claimed is:

1. A foamed formation treatment fluid comprising:
   a wettability alteration agent configured to provide an omniphobic layer on a rock surface;
   an aqueous solvent comprising water and an alcohol,
   an injection gas comprising one or more gases selected from the group consisting of air, nitrogen ($N_2$), carbon monoxide (CO), carbon dioxide ($CO_2$), and mixtures thereof; and
   optionally a foaming agent,
   wherein the wettability alteration agent comprises a fluorinated surfactant,
      wherein the wettability alteration optionally further comprises one or more selected from the group consisting of a silicon-based surfactant, charged nanoparticles partially modified with fluorine containing groups, and combinations thereof,
      wherein the fluorinated surfactant comprises a nonionic polymeric fluorochemical surfactant, a fluoroalkylsulfonate, a fluoroalkyl phosphate, a fluoroaliphatic ester, a fluoroaliphatic amine oxide, a fluoropolyether disulfate, or combinations thereof,
   wherein the wettability alteration agent, the aqueous solvent, the injection gas, and the optional foaming agent are in the form of a foamed fluid; and
   wherein the foamed formation treatment fluid has a flash point of at least 50° C.

2. The foamed formation treatment fluid of claim 1, further comprising a surfactant selected from the group consisting of a betaine-based surfactant, a viscoelastic surfactant, a polymeric surfactant, and combination thereof.

3. The foamed formation treatment fluid of claim 1, wherein the wettability alteration agent is present in the treatment fluid in an amount of about 0.01 wt % to about 10.0 wt % based on the total weight of the treatment fluid.

4. The foamed formation treatment fluid of claim 1, wherein the wettability alteration agent further comprises the silicon-based surfactant, and wherein the wettability alteration agent is present in the treatment fluid in an amount of about 0.1 wt % to about 2.0 wt % by weight based on the total weight of the treatment fluid.

5. The foamed formation treatment fluid of claim 1, wherein the wettability alteration agent further comprises the charged nanoparticles having a mean diameter in a range of from about 1 nm to about 1000 nm.

6. The foamed formation treatment fluid of claim 1, wherein the injection gas comprises natural gas.

7. The foamed formation treatment fluid of claim 1, wherein the wettability alteration agent further comprises the charged nanoparticles present in a particle suspension.

8. The foamed formation treatment fluid of claim 1, wherein the wettability alteration agent further comprises the charged nanoparticles present in a particle suspension in an amount ranging from about 0.001 wt % to about 10 wt % based on the total weight of the particle suspension.

9. The foamed formation treatment fluid of claim 7, wherein the particle suspension comprises particles functionalized with a first moiety and a second moiety,
   where the first moiety is selected from the group consisting of a silyl ether, an amine, an aromatic amine, an ammonium, a quaternary amine, a polyamine, a silanol, an isocyanate, an epoxide, a hydroxyl, a phenol, a halogen, a halosilane, a carboxyl, a carboxylate, a phosphate, a phosphonium, a phosphonate, a phosphine, a sulfonate, a sulfate, a sulfonic acid, a pyridine, a pyridinium, a sulfur, a mercaptan, an aldehyde, a succinic anhydride, an ester, a thiocynate, a silyl hydride, a methacryloxy, an acrylamide, an allyl, a zwitterionic group, and any combinations thereof; and
   where the second moiety is selected from the group consisting of a hydroxyl, an amine, a metallic oxide, a metallic carbonate, a silicate, a polyamine, a quaternary amine, an epoxide, an isocyanate, a silyl ether, an aromatic amine, an ammonium, a silanol, a phenol, a halogen, a halosilane, a carboxylic acid, a carboxylate, a phosphate group, a phosphonate group, a phosphine, a sulfonate group, a sulfate group, a sulfonic acid, a pyridinium, a sulfur, a mercaptan, an aldehyde, a succinic anhydride, an ester, a thiocynate, a silyl hydride, a methacryloxy, an acrylamide, an allyl, and any combinations thereof.

10. A method for altering a hydrocarbon-bearing reservoir surface wettability, the method comprising:
   providing a foamed formation treatment fluid comprising
      a wettability alteration agent configured to provide an omniphobic layer on a rock surface;
      an aqueous solvent comprising water and an alcohol,
      an injection gas comprising one or more gases selected from the group consisting of air, nitrogen ($N_2$), carbon monoxide (CO), carbon dioxide ($CO_2$), and mixtures thereof, and
      optionally a foaming agent,
      wherein the wettability alteration agent comprises a fluorinated surfactant,
         wherein the wettability alteration optionally further comprises one or more selected from the group consisting of a silicon-based surfactant, charged nanoparticles partially modified with fluorine containing groups, and combinations thereof, wherein the fluorinated surfactant comprises a nonionic polymeric fluorochemical surfactant, a fluoroalkylsulfonate, a fluoroalkyl phosphate, a fluoroaliphatic ester, a fluoroaliphatic amine oxide, a fluoropolyether disulfate, or combinations thereof, and wherein the foamed formation treatment fluid has a flash point of at least 50° C.;

injecting the foamed formation treatment fluid into the hydrocarbon-bearing reservoir; and recovering fluids produced from the hydrocarbon-bearing reservoir.

11. The method of claim 10, further comprising:
injecting a pre-flush treatment into the hydrocarbon-bearing reservoir prior to the injection of the formation treatment fluid,
wherein the pre-flush treatment comprises a pre-flush solvent and a rock surface modifier.

12. The method of claim 11, wherein the pre-flush solvent comprises water, brine, methanol, ethanol, isopropanol, ethylene glycol, butanol, 2-butoxyethanol, butyl carbitol, pentanol, hexanol, terpineol, geraniol, citronellol, nerol, menthol, nerolidol, turpentine, D-limonene, and farnesol, propylene glycol, propylene carbonate, ethylene carbonate, mono-ethylene glycol, di-ethylene glycol, ethylene glycol monobutylether, di-propylene glycol, tri-ethylene glycol, or any combinations thereof.

13. The method of claim 11, wherein the rock surface modifier comprises a chemical moiety selected from the group consisting of a hydroxyl, an amine, a metallic oxide, a metallic carbonate, a silicate, a polyamine, a quaternary amine, an epoxide, an isocyanate, a silyl ether, an aromatic amine, an ammonium, a silanol, a phenol, a halogen, a halosilane, a carboxylic acid, a carboxylate, a phosphate group, a phosphonate group, a phosphine, a sulfonate group, a sulfate group, a sulfonic acid, a pyridinium, a sulfur, a mercaptan, an aldehyde, a succinic anhydride, an ester, a thiocynate, a silyl hydride, a methacryloxy, an acrylamide, an allyl, and any combinations thereof.

14. The method of claim 11, wherein the pre-flush treatment further comprises an aqueous solution comprising a chelating agent.

15. The method of claim 14, wherein the chelating agent is selected from the group consisting of ethylenediaminetetraacetic acid (EDTA), methylglycinediacetic acid trisodium salt (MGDA), N,N-dicarboxymethyl glutamic acid tetrasodium salt (GLDA), hydroxyethylethylenediaminetriacetic acid (HEDTA), and any combinations thereof.

16. The method of claim 14, wherein the chelating agent is present in an amount of from about 0.1% to about 40% by weight based on the total weight of the pre-flush treatment.

17. The method of claim 11, wherein the rock surface modifier is dispersed in the pre-flush solvent prior to injecting the pre-flush treatment.

18. The method of claim 11, wherein the foamed formation treatment fluid is introduced into the hydrocarbon-bearing reservoir via coiled tubing or bullheading in a production tube.

19. The method of claim 11, wherein the foamed formation treatment fluid is in contact with the hydrocarbon-bearing reservoir surface for a time ranging from about 30 minutes to about 24 hours.

20. The foamed formation treatment fluid of claim 1, wherein the alcohol comprises one or more selected from the group consisting of ethylene glycol, n-butanol, 2-butoxyethanol, butyl carbitol, 1-pentanol, 1-hexanol, 2-butoxyethanol, terpineol, geraniol, citronellol, nerol, menthol, nerolidol, turpentine, D-limonene, farnesol, and mixtures thereof.

21. The foamed formation treatment fluid of claim 1, wherein a contact angle between an aqueous fluid and the omniphobic layer of the rock surface has a value in the range from 90° to 160°.

* * * * *